(12) United States Patent
Shono et al.

(10) Patent No.: US 9,748,833 B2
(45) Date of Patent: Aug. 29, 2017

(54) POWER CONVERSION APPARATUS AND METHOD FOR STARTING UP THE SAME

(71) Applicant: TOYOTA JIDOSHA KABUSHIKI KAISHA, Toyota-shi, Aichi-ken (JP)

(72) Inventors: Shoichi Shono, Miyoshi (JP); Masafumi Uchihara, Toyota (JP); Naoto Hasegawa, Seto (JP); Mitsuhiro Miura, Toyota (JP); Fumiki Tanahashi, Toyota (JP); Jun Muto, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/641,834

(22) Filed: Mar. 9, 2015

(65) Prior Publication Data

US 2015/0263633 A1    Sep. 17, 2015

(30) Foreign Application Priority Data

Mar. 11, 2014 (JP) ................................ 2014-048199

(51) Int. Cl.
*H02M 1/36*     (2007.01)
*H02M 3/335*    (2006.01)

(52) U.S. Cl.
CPC ......... *H02M 1/36* (2013.01); *H02M 3/33561* (2013.01); *H02M 3/33584* (2013.01)

(58) Field of Classification Search
CPC ......... H02M 3/337; H02M 2001/0083; H02M 2001/0025; H02M 2001/325; H02M 2007/53878; H02M 2001/0048
See application file for complete search history.

(56) References Cited

U.S. PATENT DOCUMENTS

| | | | | |
|---|---|---|---|---|
| 5,027,264 A | * | 6/1991 | DeDoncker | H02M 3/33584 363/129 |
| 6,574,125 B2 | * | 6/2003 | Matsukawa | H02M 3/33569 363/132 |
| 7,596,007 B2 | * | 9/2009 | Phadke | H02M 3/285 363/71 |

(Continued)

FOREIGN PATENT DOCUMENTS

| | | |
|---|---|---|
| JP | 62-144568 A | 6/1987 |
| JP | 2011-193713 A | 9/2011 |

*Primary Examiner* — Matthew Nguyen
*Assistant Examiner* — Yusef Ahmed
(74) *Attorney, Agent, or Firm* — Andrews Kurth Kenyon LLP

(57) ABSTRACT

A power conversion apparatus includes a transformer; a primary side full bridge circuit provided on a primary side of the transformer; a first port connected to the primary side full bridge circuit; a second port connected to a center tap of the primary side of the transformer; a secondary side full bridge circuit provided on a secondary side of the transformer; a third port connected to the secondary side full bridge circuit; and a control unit configured to cause an upper arm of the secondary side full bridge circuit to operate in an active region in a case where a capacitor connected to the third port is charged with a transmitted power transmitted to the secondary side full bridge circuit via the transformer from the primary side full bridge circuit when power of the second port is stepped up and the stepped up power is output to the first port.

16 Claims, 10 Drawing Sheets

(56) References Cited

U.S. PATENT DOCUMENTS

| | | | |
|---|---|---|---|
| 9,203,322 B2* | 12/2015 | Muto | H02M 3/33592 |
| 9,209,701 B2* | 12/2015 | Takagi | H02M 3/33546 |
| 9,214,825 B2* | 12/2015 | Sun | H02M 3/33592 |
| 9,300,219 B2* | 3/2016 | Hirano | H02M 3/33561 |
| 2007/0195557 A1* | 8/2007 | Su | B60K 6/28 363/17 |
| 2008/0174276 A1* | 7/2008 | Takahashi | H02J 9/061 320/128 |
| 2008/0212340 A1* | 9/2008 | Tao | H02M 3/33584 363/17 |
| 2009/0034299 A1* | 2/2009 | Lev | H02M 3/33592 363/17 |
| 2009/0153113 A1* | 6/2009 | Zilberberg | H02M 5/293 323/282 |
| 2009/0237057 A1* | 9/2009 | Dishman | H02M 3/156 323/285 |
| 2011/0128758 A1* | 6/2011 | Ueno | H02M 3/335 363/17 |
| 2011/0198933 A1* | 8/2011 | Ishigaki | B60R 25/00 307/66 |
| 2011/0234191 A1* | 9/2011 | Yeon | H02M 3/156 323/285 |
| 2011/0249472 A1* | 10/2011 | Jain | H02M 3/33584 363/15 |
| 2012/0140524 A1* | 6/2012 | Manabe | H02M 3/3378 363/17 |
| 2012/0153729 A1* | 6/2012 | Song | H02J 7/0013 307/82 |
| 2012/0163035 A1* | 6/2012 | Song | H02M 3/33584 363/17 |
| 2012/0250370 A1* | 10/2012 | Taniguchi | H02M 3/33561 363/34 |
| 2013/0044519 A1* | 2/2013 | Teraura | H02M 3/33584 363/17 |
| 2013/0264984 A1* | 10/2013 | Tamura | H02M 7/48 318/400.27 |
| 2014/0133187 A1* | 5/2014 | Hirano | H02M 3/33592 363/17 |
| 2015/0146455 A1* | 5/2015 | Engel | H02M 3/33584 363/17 |

* cited by examiner

POWER CONVERSION APPARATUS AND METHOD FOR STARTING UP THE SAME

INCORPORATION BY REFERENCE

The disclosure of Japanese Patent Application No. 2014-048199 filed on Mar. 11, 2014 including the specification, drawings and abstract is incorporated herein by reference in its entirety.

BACKGROUND OF THE INVENTION

1. Field of the Invention

The present invention relates to a technique for converting power between a plurality of ports.

2. Description of Related Art

A power conversion apparatus for converting power between a plurality of input/output ports is known (see Japanese Patent Application Publication No. 2011-193713 (JP 2011-193713 A), for example). A capacitor is connected to at least one port in the power conversion apparatus.

However, if a power supply is connected to the port in a state where the capacitor that is connected to the port is almost not charged, there is a possibility that an inrush current flowing to the capacitor becomes excessive.

SUMMARY OF THE INVENTION

Therefore, the present invention provides a power conversion apparatus and a method for starting up the same which enable to suppress an inrush current flowing to a capacitor that is connected to a port.

According to one aspect of the present invention, there is provided a power conversion apparatus including: a transformer; a primary side full bridge circuit that is provided on a primary side of the transformer; a first port that is connected to the primary side full bridge circuit; a second port that is connected to a center tap of the primary side of the transformer; a secondary side full bridge circuit that is provided on a secondary side of the transformer; a third port that is connected to the secondary side full bridge circuit; and a control unit that is configured to cause an upper arm of the secondary side full bridge circuit to operate in an active region in a case where a capacitor that is connected to the third port is charged with a transmitted power that is transmitted to the secondary side full bridge circuit via the transformer from the primary side full bridge circuit when a power of the second port is stepped up and the stepped up power is output to the first port.

According to one embodiment, it is capable of suppressing an inrush current flowing to a capacitor that is connected to a port.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

<Configuration of Power Supply Apparatus 101>

Figure 1:
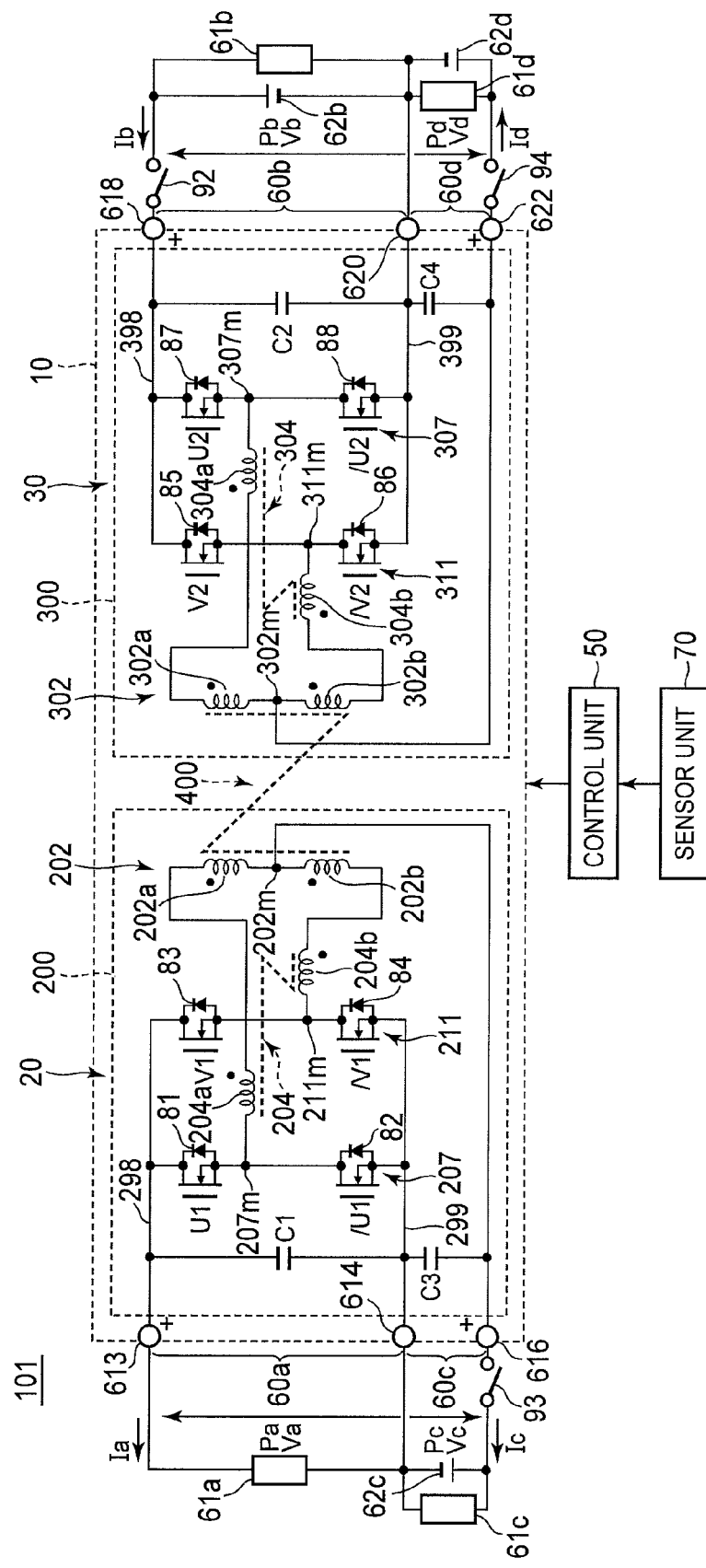
FIG. 1 is a diagram showing an example of a configuration of a power conversion apparatus.

FIG. 1 is a block diagram showing an example of a configuration of a power supply apparatus 101 which is an embodiment of a power conversion apparatus. For example, the power supply apparatus 101 is a power supply system that includes a power supply circuit 10, a control unit 50 and a sensor unit 70. For example, the power supply apparatus 101 is a system that is mounted on a vehicle such as an automobile, and distributes power to various loads of the vehicle. A hybrid vehicle, a plug-in hybrid vehicle, an electric vehicle, and so on may be cited as specific examples of this vehicle. The power supply apparatus 101 may also be mounted on a vehicle using an engine as a driving source.

For example, the power supply apparatus 101 includes, as primary side ports, a first input/output port 60a to which a primary side high voltage system load 61a is connected and a second input/output port 60c to which a primary side low voltage system load 61c and a primary side low voltage system power supply 62c are connected. The primary side low voltage system power supply 62c supplies power to the primary side low voltage system load 61c, which is operated by an identical voltage system (a 12 V system, for example) to the primary side low voltage system power supply 62c. Further, the primary side low voltage system power supply 62c supplies power stepped up by a primary side conversion circuit 20 provided in the power supply circuit 10 to the primary side high voltage system load 61a, for example, which is operated by a different voltage system (a higher 48 V system than the 12 V system, for example) to the primary side low voltage system power supply 62c. A secondary battery such as a lead battery may be cited as a specific example of the primary side low voltage system power supply 62c.

For example, the power supply apparatus 101 includes, as secondary side ports, a third input/output port 60b to which a secondary side high voltage system load 61b and a secondary side high voltage system power supply 62b are connected and a fourth input/output port 60d to which a secondary side low voltage system load 61d and a secondary side low voltage system power supply 62d are connected. The secondary side high voltage system power supply 62b supplies power to the secondary side high voltage system load 61b, which is operated by an identical voltage system (a higher 288 V system than the 12 V system and the 48 V system, for example) to the secondary side high voltage system power supply 62b. Further, the secondary side high voltage system power supply 62b supplies power stepped down by a secondary side conversion circuit 30 provided in the power supply circuit 10 to the secondary side low voltage system load 61d, for example, which is operated by a different voltage system (a lower 72 V system than the 288 V system, for example) to the secondary side high voltage system power supply 62b. A secondary battery such as a lithium ion battery may be cited as a specific example of the secondary side high voltage system power supply 62b.

The secondary side low voltage system power supply 62d supplies power to the secondary side low voltage system load 61d, which is operated by an identical voltage system (the 72 V system, for example) to the secondary side low voltage system power supply 62d. Further, the secondary side low voltage system power supply 62d supplies power stepped up by the secondary side conversion circuit 30 provided in the power supply circuit 10 to the secondary side high voltage system load 61b, for example, which is operated by a higher voltage system (the 288 V system, for example) than the secondary side low voltage system power supply 62d. A solar power supply (a solar power generator), an AC-DC converter for converting a commercial AC power into a DC power, a secondary battery and so on may be cited as a specific example of the secondary side low voltage system power supply 62d.

The power supply circuit 10 is a power conversion circuit that includes the four input/output ports described above and has functions for selecting any two input/output ports from the four input/output ports and performing power conversion between the two input/output ports. Further, the power supply apparatus 101 including the power supply circuit 10 may be an apparatus that includes a plurality of, at least three, input/output ports, and is capable of converting power between any two input/output ports from the plurality of, at least three, input/output ports. For example, the power supply circuit 10 may also be a circuit that has three input/output ports without the fourth input/output port 60d.

Port powers Pa, Pc, Pb, Pd are input/output powers (input powers or output powers) of the first input/output port 60a, the second input/output port 60c, the third input/output port 60b, and the fourth input/output port 60d, respectively. Port voltages Va, Vc, Vb, Vd are input/output voltages (input voltages or output voltages) of the first input/output port 60a, the second input/output port 60c, the third input/output port 60b, and the fourth input/output port 60d, respectively. Port currents Ia, Ic, Ib, Id are input/output currents (input currents or output currents) of the first input/output port 60a, the second input/output port 60c, the third input/output port 60b, and the fourth input/output port 60d, respectively.

The power supply circuit 10 includes a capacitor C1 that is provided to connect to the first input/output port 60a, a capacitor C3 that is provided to connect to the second input/output port 60c, a capacitor C2 that is provided to connect to the third input/output port 60b, and a capacitor C4 that is provided to connect to the fourth input/output port 60d. Film capacitors, aluminum electrolytic capacitors, ceramic capacitors, polymer electrolytic capacitors, and so on may be cited as specific examples of the capacitors C1, C2, C3, C4.

The capacitor C1 is inserted between a high potential side terminal 613 of the first input/output port 60a and a low potential side terminal 614 of the first input/output port 60a and the second input/output port 60c. The capacitor C3 is inserted between a high potential side terminal 616 of the second input/output port 60c and the low potential side terminal 614 of the first input/output port 60a and the second input/output port 60c. The capacitor C2 is inserted between a high potential side terminal 618 of the third input/output port 60b and a low potential side terminal 620 of the third input/output port 60b and the fourth input/output port 60d. The capacitor C4 is inserted between a high potential side terminal 622 of the fourth input/output port 60d and the low potential side terminal 620 of the third input/output port 60b and the fourth input/output port 60d.

The capacitors C1, C2, C3, C4 may be provided either inside or outside the power supply circuit 10.

The power supply circuit 10 is a power conversion circuit configured to include the primary side conversion circuit 20 and the secondary side conversion circuit 30. Further, the primary side conversion circuit 20 and the secondary side conversion circuit 30 are connected via a primary side magnetic coupling reactor 204 and a secondary side magnetic coupling reactor 304, and magnetically coupled by a transformer 400 (a center tapped transformer). The primary side ports configured of the first input/output port 60a and the second input/output port 60c and the secondary side ports configured of the third input/output port 60b and the fourth input/output port 60d are connected via the transformer 400.

The primary side conversion circuit 20 is a primary side circuit configured to include a primary side full bridge circuit 200, the first input/output port 60a, and the second input/output port 60c. The primary side full bridge circuit 200 is provided on a primary side of the transformer 400. The primary side full bridge circuit 200 is a primary side power conversion unit configured to include a primary side coil 202 of the transformer 400, the primary side magnetic coupling reactor 204, a primary side first upper arm U1, a primary side first lower arm /U1, a primary side second upper arm V1, and a primary side second lower arm /V1. Here, the primary side first upper arm U1, the primary side first lower arm /U1, the primary side second upper arm V1, and the primary side second lower arm /V1 are constituted by switching elements respectively configured to include, for example, an N channel type metal oxide semiconductor field effect transistor (MOSFET) and a body diode (a parasitic diode) serving as a parasitic element of the MOSFET. Additional diodes may be connected to the MOSFET in parallel. Diodes 81, 82, 83, 84 are illustrated in FIG. 1.

The primary side full bridge circuit 200 includes a primary side positive electrode bus line 298 connected to the high potential side terminal 613 of the first input/output port 60a, and a primary side negative electrode bus line 299 connected to the low potential side terminal 614 of the first input/output port 60a and the second input/output port 60c.

A primary side first arm circuit 207 connecting the primary side first upper arm U1 and the primary side first lower arm /U1 in series is attached between the primary side positive electrode bus line 298 and the primary side negative electrode bus line 299. The primary side first arm circuit 207 is a primary side first power conversion circuit unit (a primary side U phase power conversion circuit unit) capable of performing a power conversion operation by switching the primary side first upper arm U1 and the primary side first lower arm /U1 ON and OFF. Further, a primary side second arm circuit 211 connecting the primary side second upper arm V1 and the primary side second lower arm /V1 in series is attached between the primary side positive electrode bus line 298 and the primary side negative electrode bus line 299 in parallel with the primary side first arm circuit 207. The primary side second arm circuit 211 is a primary side second power conversion circuit unit (a primary side V phase power conversion circuit unit) capable of performing a power conversion operation by switching the primary side second upper arm V1 and the primary side second lower arm /V1 ON and OFF.

The primary side coil 202 and the primary side magnetic coupling reactor 204 are provided in a bridge part connecting a midpoint 207m of the primary side first arm circuit 207 to a midpoint 211m of the primary side second arm circuit 211. To describe connection relationships to the bridge part in more detail, one end of a primary side first reactor 204a of the primary side magnetic coupling reactor 204 is connected to the midpoint 207m of the primary side first arm circuit 207, and one end of the primary side coil 202 is connected to another end of the primary side first reactor 204a. Further, one end of a primary side second reactor 204b of the primary side magnetic coupling reactor 204 is connected to another end of the primary side coil 202, and another end of the primary side second reactor 204b is connected to the midpoint 211m of the primary side second arm circuit 211. Note that the primary side magnetic coupling reactor 204 is configured to include the primary side first reactor 204a and the primary side second reactor 204b, which is magnetically coupled to the primary side first reactor 204a by a coupling coefficient $k_1$.

The midpoint 207m is a primary side first intermediate node between the primary side first upper arm U1 and the primary side first lower arm /U1, and the midpoint 211m is a primary side second intermediate node between the primary side second upper arm V1 and the primary side second lower arm /V1.

The first input/output port 60a is a port which is connected to the primary side full bridge circuit 200 and is provided between the primary side positive electrode bus line 298 and the primary side negative electrode bus line 299. The first input/output port 60a is configured to include the terminal 613 and the terminal 614. The second input/output port 60c is a port which is connected to a center tap 202m of the primary side of the transformer 400 and is provided between the primary side negative electrode bus line 299 and the center tap 202m of the primary side coil 202. The second input/output port 60c is configured to include the terminal 614 and the terminal 616.

The center tap 202m is connected to the high potential side terminal 616 of the second input/output port 60c. The center tap 202m is an intermediate connection point between a primary side first winding 202a and a primary side second winding 202b constituting the primary side coil 202.

The secondary side conversion circuit 30 is a secondary side circuit configured to include a secondary side full bridge circuit 300, the third input/output port 60b, and the fourth input/output port 60d. The secondary side full bridge circuit 300 is provided on a secondary side of the transformer 400. The secondary side full bridge circuit 300 is a secondary side power conversion unit configured to include a secondary side coil 302 of the transformer 400, the secondary side magnetic coupling reactor 304, a secondary side first upper arm U2, a secondary side first lower arm /U2, a secondary side second upper arm V2, and a secondary side second lower arm /V2. Here, the secondary side first upper arm U2, the secondary side first lower arm /U2, the secondary side second upper arm V2, and the secondary side second lower arm /V2 are constituted by switching elements respectively configured to include, for example, an N channel type MOSFET and a body diode (a parasitic diode) serving as a parasitic element of the MOSFET. Additional diodes may be connected to the MOSFET in parallel. Diodes 85, 86, 87, 88 are illustrated in FIG. 1.

The secondary side full bridge circuit 300 includes a secondary side positive electrode bus line 398 connected to the high potential side terminal 618 of the third input/output port 60b, and a secondary side negative electrode bus line 399 connected to the low potential side terminal 620 of the third input/output port 60b and the fourth input/output port 60d.

A secondary side first arm circuit 307 connecting the secondary side first upper arm U2 and the secondary side first lower arm /U2 in series is attached between the secondary side positive electrode bus line 398 and the secondary side negative electrode bus line 399. The secondary side first arm circuit 307 is a secondary side first power conversion circuit unit (a secondary side U phase power conversion circuit unit) capable of performing a power conversion operation by switching the secondary side first upper arm U2 and the secondary side first lower arm /U2 ON and OFF. Further, a secondary side second arm circuit 311 connecting the secondary side second upper arm V2 and the secondary side second lower arm /V2 in series is attached between the secondary side positive electrode bus line 398 and the secondary side negative electrode bus line 399 in parallel with the secondary side first arm circuit 307. The secondary side second arm circuit 311 is a secondary side second power conversion circuit unit (a secondary side V phase power conversion circuit unit) capable of performing a power conversion operation by switching the secondary side second upper arm V2 and the secondary side second lower arm /V2 ON and OFF.

The secondary side coil 302 and the secondary side magnetic coupling reactor 304 are provided in a bridge part connecting a midpoint 307m of the secondary side first arm circuit 307 to a midpoint 311m of the secondary side second arm circuit 311. To describe connection relationships to the bridge part in more detail, one end of a secondary side first reactor 304a of the secondary side magnetic coupling reactor 304 is connected to the midpoint 307m of the secondary side first arm circuit 307, and one end of the secondary side coil 302 is connected to another end of the secondary side first reactor 304a. Further, one end of a secondary side second reactor 304b of the secondary side magnetic coupling reactor 304 is connected to another end of the secondary side coil 302, and another end of the secondary side second reactor 304b is connected to the midpoint 311m of the secondary side second arm circuit 311. Note that the secondary side magnetic coupling reactor 304 is configured to include the secondary side first reactor 304a and the secondary side second reactor 304b, which is magnetically coupled to the secondary side first reactor 304a by a coupling coefficient $k_2$.

The midpoint 307m is a secondary side first intermediate node between the secondary side first upper arm U2 and the secondary side first lower arm /U2, and the midpoint 311m is a secondary side second intermediate node between the secondary side second upper arm V2 and the secondary side second lower arm /V2.

The third input/output port 60b is a port which is connected to the secondary side full bridge circuit 300 and is provided between the secondary side positive electrode bus line 398 and the secondary side negative electrode bus line 399. The third input/output port 60b is configured to include the terminal 618 and the terminal 620. The fourth input/output port 60d is a port which is connected to a center tap 302m of the secondary side of the transformer 400 and is provided between the secondary side negative electrode bus line 399 and the center tap 302m of the secondary side coil 302. The fourth input/output port 60d is configured to include the terminal 620 and the terminal 622.

The center tap 302m is connected to the high potential side terminal 622 of the fourth input/output port 60d. The center tap 302m is an intermediate connection point between a secondary side first winding 302a and a secondary side second winding 302b constituting the secondary side coil 302.

In FIG. 1, the power supply apparatus 101 includes the sensor unit 70. The sensor unit 70 serves as detecting means that detects an input/output value Y of at least one of the first to fourth input/output ports 60a, 60c, 60b, 60d at predetermined detection period intervals and outputs a detection value Yd corresponding to the detected input/output value Y to the control unit 50. The detection value Yd may be a detected voltage obtained by detecting the input/output voltage, a detected current obtained by detecting the input/output current, or a detected power obtained by detecting the input/output power. The sensor unit 70 may be provided either inside or outside the power supply circuit 10.

The sensor unit 70 includes, for example, a voltage detection unit that detects the input/output voltage generated in at least one of the first to fourth input/output ports 60a, 60c, 60b, 60d. For example, the sensor unit 70 includes a primary side voltage detection unit that outputs at least one detected voltage from among an input/output voltage Va and an input/output voltage Vc as a primary side voltage detection value, and a secondary side voltage detection unit that outputs at least one detected voltage from among an input/output voltage Vb and an input/output voltage Vd as a secondary side voltage detection value.

The voltage detection unit of the sensor unit 70 includes, for example, a voltage sensor that monitors an input/output voltage value of at least one port, and a voltage detection circuit that outputs a detected voltage corresponding to the input/output voltage value monitored by the voltage sensor to the control unit 50.

The sensor unit 70 includes, for example, a current detection unit that detects the input/output current flowing through at least one of the first to fourth input/output ports 60a, 60c, 60b, 60d. For example, the sensor unit 70 includes a primary side current detection unit that outputs at least one detected current from among an input/output current Ia and an input/output current Ic as a primary side current detection value, and a secondary side current detection unit that outputs at least one detected current from among an input/output current Ib and an input/output current Id as a secondary side current detection value.

The current detection unit of the sensor unit 70 includes, for example, a current sensor that monitors an input/output current value of at least one port, and a current detection circuit that outputs a detected current corresponding to the input/output current value monitored by the current sensor to the control unit 50.

The power supply apparatus 101 includes the control unit 50. For example, the control unit 50 is an electronic circuit that includes a microcomputer having an inbuilt central processing unit (CPU). The control unit 50 may be provided either inside or outside the power supply circuit 10.

The control unit 50 feedback-controls a power conversion operation performed by the power supply circuit 10 such that the detected value Yd of the input/output value Y of at least one of the first to fourth input/output ports 60a, 60c, 60b, 60d converges to a target value Yo set in the port. For example, the target value Yo is a command value set by the control unit 50 or a predetermined apparatus other than the control unit 50 on the basis of driving conditions defined in relation to the respective loads (the primary side low voltage system load 61c and so on, for example) connected to the input/output ports. The target value Yo functions as an output target value when power is output from the port and an input target value when power is input into the port, and may be a target voltage value, a target current value, or a target power value.

Further, the control unit 50 feedback-controls the power conversion operation performed by the power supply circuit 10 such that a transmitted power P transmitted between the primary side conversion circuit 20 and the secondary side conversion circuit 30 via the transformer 400 converges to a set target transmitted power Po. The transmitted power will also be referred to as power transmission amount. The target transmitted power will also be referred to as command transmitted power.

The control unit 50 feedback-controls the power conversion operation performed by the power supply circuit 10 by varying a value of a predetermined control parameter X, and is thus capable of adjusting the respective input/output values Y of the first to fourth input/output ports 60a, 60c, 60b, 60d of the power supply circuit 10. Two control variables, namely a phase difference φ and a duty ratio D (an ON time δ) are used as the main control parameters X.

The phase difference φ is a deviation (a time lag) between switching timings of identical-phase power conversion circuit units of the primary side full bridge circuit 200 and the secondary side full bridge circuit 300. The duty ratio D (the ON time δ) is a duty ratio (an ON time) between switching waveforms of the respective power conversion circuit units constituting the primary side full bridge circuit 200 and the secondary side full bridge circuit 300.

The two control parameters X can be controlled independently of each other. The control unit 50 varies the input/output values Y of the respective input/output ports of the power supply circuit 10 by performing duty ratio control and/or phase control on the primary side full bridge circuit 200 and the secondary side full bridge circuit 300 using the phase difference φ and the duty ratio D (the ON time δ).

Figure 2:
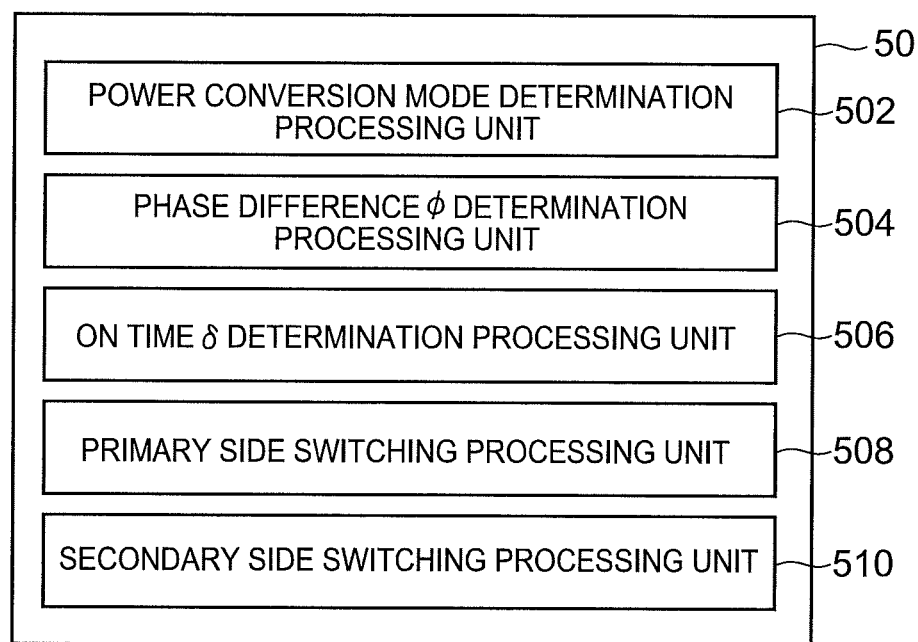
FIG. 2 is a diagram showing an example of a configuration of a control unit.

FIG. 2 is a block diagram of the control unit 50. The control unit 50 is a control unit having a function for performing switching control on the respective switching elements of the primary side conversion circuit 20, such as the primary side first upper arm U1, and the respective switching elements of the secondary side conversion circuit 30, such as the secondary side first upper arm U2. The control unit 50 is configured to include a power conversion mode determination processing unit 502, a phase difference φ determination processing unit 504, an ON time δ determination processing unit 506, a primary side switching processing unit 508, and a secondary side switching processing unit 510. For example, the control unit 50 is an electronic circuit that includes a microcomputer having an inbuilt CPU.

For example, the power conversion mode determination processing unit 502 selects and sets an operating mode from among power conversion modes A to L of the power supply circuit 10, to be described below, on the basis of a predetermined external signal (for example, a signal indicating the deviation between the detected value Yd and the target value Yo in one of the ports). As regards the power conversion modes, in mode A, power input from the first input/output port 60a is converted and output to the second input/output port 60c. In mode B, power input from the first input/output port 60a is converted and output to the third input/output port 60b. In mode C, power input from the first input/output port 60a is converted and output to the fourth input/output port 60d.

In mode D, power input from the second input/output port 60c is converted and output to the first input/output port 60a. In mode E, power input from the second input/output port 60c is converted and output to the third input/output port 60b. In mode F, power input from the second input/output port 60c is converted and output to the fourth input/output port 60d.

In mode G, power input from the third input/output port 60b is converted and output to the first input/output port 60a. In mode H, power input from the third input/output port 60b is converted and output to the second input/output port 60c. In mode I, power input from the third input/output port 60b is converted and output to the fourth input/output port 60d.

In mode J, power input from the fourth input/output port 60d is converted and output to the first input/output port 60a. In mode K, power input from the fourth input/output port 60d is converted and output to the second input/output port 60c. In mode L, power input from the fourth input/output port 60d is converted and output to the third input/output port 60b.

The phase difference $\phi$ determination processing unit 504 has a function for setting a phase difference $\phi$ between switching period motions of the switching elements between the primary side conversion circuit 20 and the secondary side conversion circuit 30 in order to cause the power supply circuit 10 to function as a direct current-direct current (DC-DC) converter circuit.

The ON time $\delta$ determination processing unit 506 has a function for setting an ON time $\delta$ of the switching elements of the primary side conversion circuit 20 and the secondary side conversion circuit 30 in order to cause the primary side conversion circuit 20 and the secondary side conversion circuit 30 to function respectively as step-up/step-down circuits.

The primary side switching processing unit 508 has a function for performing switching control on the respective switching elements constituted by the primary side first upper arm U1, the primary side first lower arm /U1, the primary side second upper arm V1, and the primary side second lower arm /V1, on the basis of outputs of the power conversion mode determination processing unit 502, the phase difference $\phi$ determination processing unit 504, and the ON time $\delta$ determination processing unit 506.

The secondary side switching processing unit 510 has a function for performing switching control on the respective switching elements constituted by the secondary side first upper arm U2, the secondary side first lower arm /U2, the secondary side second upper arm V2, and the secondary side second lower arm /V2, on the basis of the outputs of the power conversion mode determination processing unit 502, the phase difference $\phi$ determination processing unit 504, and the ON time $\delta$ determination processing unit 506.

<Operation of Power Supply Apparatus 101>

An operation of the power supply apparatus 101 having the above configuration will now be described using FIGS. 1 and 2. When, for example, an external signal requesting an operation in which the power conversion mode of the power supply circuit 10 is set at mode F is input, the power conversion mode determination processing unit 502 of the control unit 50 sets the power conversion mode of the power supply circuit 10 to mode F. At this time, a power input into the second input/output port 60c is stepped up by a step-up function of the primary side conversion circuit 20, whereupon the stepped-up power is transmitted to the third input/ output port 60b side by a DC-DC converter circuit function of the power supply circuit 10, stepped down by a step-down function of the secondary side conversion circuit 30, and then output from the fourth input/output port 60d.

Here, a step-up/step-down function of the primary side conversion circuit 20 will be described in detail. Focusing on the second input/output port 60c and the first input/output port 60a, the terminal 616 of the second input/output port 60c is connected to the midpoint 207m of the primary side first arm circuit 207 via the primary side first winding 202a and the primary side first reactor 204a connected in series to the primary side first winding 202a. Respective ends of the primary side first arm circuit 207 are connected to the first input/output port 60a, and as a result, a step-up/step-down circuit is attached between the terminal 616 of the second input/output port 60c and the first input/output port 60a.

The terminal 616 of the second input/output port 60c is also connected to the midpoint 211m of the primary side second arm circuit 211 via the primary side second winding 202b and the primary side second reactor 204b connected in series to the primary side second winding 202b. Respective ends of the primary side second arm circuit 211 are connected to the first input/output port 60a, and as a result, a step-up/step-down circuit is attached in parallel between the terminal 616 of the second input/output port 60c and the first input/output port 60a. Note that since the secondary side conversion circuit 30 is a circuit having a substantially identical configuration to the primary side conversion circuit 20, two step-up/step-down circuits are likewise connected in parallel between the terminal 622 of the fourth input/output port 60d and the third input/output port 60b. Hence, the secondary side conversion circuit 30 has an identical step-up/step-down function to the primary side conversion circuit 20.

Next, the function of the power supply circuit 10 as a DC-DC converter circuit will be described in detail. Focusing on the first input/output port 60a and the third input/output port 60b, the primary side full bridge circuit 200 is connected to the first input/output port 60a, and the secondary side full bridge circuit 300 is connected to the third input/output port 60b. When the primary side coil 202 provided in the bridge part of the primary side full bridge circuit 200 and the secondary side coil 302 provided in the bridge part of the secondary side full bridge circuit 300 are magnetically coupled by a coupling coefficient $k_T$, the transformer 400 functions as a center tapped transformer having a number of windings 1:N. Hence, by adjusting the phase difference $\phi$ between the switching period motions of the switching elements in the primary side full bridge circuit 200 and the secondary side full bridge circuit 300, power input into the first input/output port 60a can be converted and transmitted to the third input/output port 60b or power input into the third input/output port 60b can be converted and transmitted to the first input/output port 60a.

Figure 3:
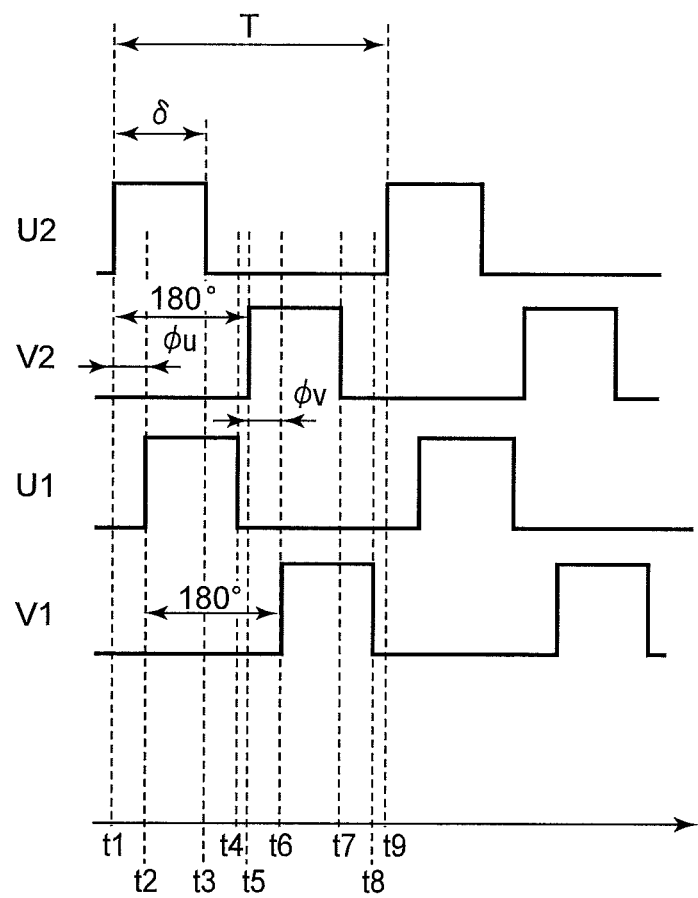
FIG. 3 is a timing chart showing an example of switching operations of a primary side circuit and a secondary side circuit.

FIG. 3 is a view showing a timing chart of ON/OFF switching waveforms of the respective arms provided in the power supply circuit 10 resulting from control executed by the control unit 50. In FIG. 3, U1 is an ON/OFF waveform of the primary side first upper arm U1, V1 is an ON/OFF waveform of the primary side second upper arm V1, U2 is an ON/OFF waveform of the secondary side first upper arm U2, and V2 is an ON/OFF waveform of the secondary side second upper arm V2. ON/OFF waveforms of the primary side first lower arm /U1, the primary side second lower arm /V1, the secondary side first lower arm /U2, and the secondary side second lower arm /V2 are inverted waveforms (not shown) obtained by respectively inverting the ON/OFF waveforms of the primary side first upper arm U1, the primary side second upper arm V1, the secondary side first upper arm U2, and the secondary side second upper arm V2. Note that dead time is preferably provided between the respective ON/OFF waveforms of the upper and lower arms to prevent a through current from flowing when both the upper and lower arms are switched ON. Further, in FIG. 3, a high level indicates an ON condition and a low level indicates an OFF condition.

Here, by modifying the respective ON times δ of U1, V1, U2, and V2, step-up/step-down ratios of the primary side conversion circuit 20 and the secondary side conversion circuit 30 can be modified. For example, by making the respective ON times δ of U1, V1, U2, and V2 equal to each other, the step-up/step-down ratio of the primary side conversion circuit 20 can be made equal to the step-up/step-down ratio of the secondary side conversion circuit 30.

The ON time δ determination processing unit 506 makes the respective ON times δ of U1, V1, U2, and V2 equal to each other (respective ON times δ=primary side ON time δ11=secondary side ON time δ12=time value α) so that the respective step-up/step-down ratios of the primary side conversion circuit 20 and the secondary side conversion circuit 30 are equal to each other.

The step-up/step-down ratio of the primary side conversion circuit 20 is determined by the duty ratio D, which is a proportion of a switching period T of the switching elements (arms) constituting the primary side full bridge circuit 200 occupied by the ON time δ. Similarly, the step-up/step-down ratio of the secondary side conversion circuit 30 is determined by the duty ratio D, which is a proportion of the switching period T of the switching elements (arms) constituting the secondary side full bridge circuit 300 occupied by the ON time δ. The step-up/step-down ratio of the primary side conversion circuit 20 is a transformation ratio between the first input/output port 60$a$ and the second input/output port 60$c$, while the step-up/step-down ratio of the secondary side conversion circuit 30 is a transformation ratio between the third input/output port 60$b$ and the fourth input/output port 60$d$.

Therefore, for example, it is expressed as: the step-up/step-down ratio of the primary side conversion circuit 20=the voltage of the second input/output port 60$c$/the voltage of the first input/output port 60$a$=δ11/T=α/T, and the step-up/step-down ratio of the secondary side conversion circuit 30=the voltage of the fourth input/output port 60$d$/the voltage of the third input/output port 60$b$=δ12/T=α/T. In other words, the respective step-up/step-down ratios of the primary side conversion circuit 20 and the secondary side conversion circuit 30 take identical values (=α/T).

Note that the ON time δ in FIG. 3 represents both the ON time δ11 of the primary side first upper arm U11 and the primary side second upper arm V1 and the ON time δ12 of the secondary side first upper arm U2 and the secondary side second upper arm V2. Further, the switching period T of the arms constituting the primary side full bridge circuit 200 and the switching period T of the arms constituting the secondary side full bridge circuit 300 are equal times.

Furthermore, a phase difference between U1 and V1 is activated at 180 degrees (π), and a phase difference between U2 and V2 is likewise activated at 180 degrees (π). The phase difference between U1 and V1 is a time difference between a timing t2 and a timing t6, and the phase difference between U2 and V2 is a time difference between a timing t1 and a timing t5.

Moreover, by changing at least one of a phase difference φu between U1 and U2 and a phase difference φv between V1 and V2, the transmitted power P that is transmitted between the primary side conversion circuit 20 and the secondary side conversion circuit 30 can be adjusted. The phase difference φu is a time difference between the timing t1 and the timing t2, and the phase difference φv is a time difference between the timing t5 and the timing t6.

The control unit 50 is an example of a control unit for controlling the transmitted power P that is transmitted between the primary side full bridge circuit 200 and the secondary side full bridge circuit 300 via the transformer 400 by adjusting the phase difference φu and the phase difference φv.

The phase difference φu is a time difference between switching of the primary side first arm circuit 207 and switching of the secondary side first arm circuit 307. For example, the phase difference φu is a difference between the turn-on timing t2 of the primary side first upper arm U1 and the turn-on timing t1 of the secondary side first upper arm U2. The control unit 50 controls the switching of the primary side first arm circuit 207 and the switching of the secondary side first arm circuit 307 in an identical-phase with each other (that is, in the U phase). Similarly, the phase difference φv is a time difference between switching of the primary side second arm circuit 211 and switching of the secondary side second arm circuit 311. For example, the phase difference φv is a difference between the turn-on timing t6 of the primary side second upper arm V1 and the turn-on timing t5 of the secondary side second upper arm V2. The control unit 50 controls the switching of the primary side second arm circuit 211 and the switching of the secondary side second arm circuit 311 in an identical-phase with each other (that is, in the V phase).

When the phase difference φu>0 or the phase difference φv>0, the transmitted power P can be transmitted from the primary side conversion circuit 20 to the secondary side conversion circuit 30, and when the phase difference φu<0 or the phase difference φv<0, the transmitted power P can be transmitted from the secondary side conversion circuit 30 to the primary side conversion circuit 20. That is, between identical-phase power conversion circuit units of the primary side full bridge circuit 200 and the secondary side full bridge circuit 300, the transmitted power P is transmitted from the full bridge circuit of the power conversion circuit unit including an upper arm that is turned on first to the full bridge circuit of the power conversion circuit unit including an upper arm that is turned on later.

For example, in FIG. 3, the turn-on timing t1 of the secondary side first upper arm U2 is earlier than the turn-on timing t2 of the primary side first upper arm U1. Therefore, the transmitted power P is transmitted from the secondary side full bridge circuit 300 including the secondary side first arm circuit 307 having the secondary side first upper arm U2 to the primary side full bridge circuit 200 including the primary side first arm circuit 207 having the primary side first upper arm U1. Similarly, the turn-on timing t5 of the secondary side second upper arm V2 is earlier than the turn-on timing t6 of the primary side second upper arm V1. Therefore, the transmitted power P is transmitted from the secondary side full bridge circuit 300 including the secondary side second arm circuit 311 having the secondary side second upper arm V2 to the primary side full bridge circuit 200 including the primary side second arm circuit 211 having the primary side second upper arm V1.

The phase difference φ is a deviation (a time lag) between the switching timings of the identical-phase power conversion circuit units of the primary side full bridge circuit 200 and the secondary side full bridge circuit 300. For example, the phase difference φu is a deviation between the switching timings of the phases corresponding to the primary side first arm circuit 207 and the secondary side first arm circuit 307, and the phase difference φv is a deviation between the switching timings of the phases corresponding to the primary side second arm circuit 211 and the secondary side second arm circuit 311.

The control unit 50 typically performs a control in a state that the phase difference φu and the phase difference φv are equal to each other. However, the control unit 50 may also perform the control in a state that the phase difference φu and the phase difference φv are offset from one another within a range in which an accuracy required for the transmitted power P is satisfied. That is, the phase difference φu and the phase difference φv are typically controlled to be values equal to each other, whereas if the accuracy required for the transmitted power P is satisfied, the phase difference φu and the phase difference φv may be controlled to be values different from each other.

Hence, when, for example, an external signal requesting an operation in which the power conversion mode of the power supply circuit 10 is set at mode F is input, the power conversion mode determination processing unit 502 selects and sets mode F. The ON time δ determination processing unit 506 then sets the ON time δ to define a step-up ratio required when the primary side conversion circuit 20 is caused to function as a step-up circuit that steps up the voltage input into the second input/output port 60c and outputs the stepped-up voltage to the first input/output port 60a. Note that the secondary side conversion circuit 30 functions as a step-down circuit that steps down the voltage input into the third input/output port 60b at a step-down ratio defined according to the ON time δ set by the ON time δ determination processing unit 506, and outputs the stepped-down voltage to the fourth input/output port 60d. Further, the phase difference φ determination processing unit 504 sets the phase difference φ such that the power input into the first input/output port 60a is transmitted to the third input/output port 60b in the desired power transmission amount P.

The primary side switching processing unit 508 performs switching control on the respective switching elements constituted by the primary side first upper arm U1, the primary side first lower arm /U1, the primary side second upper arm V1, and the primary side second lower arm /V1 to cause the primary side conversion circuit 20 to function as a step-up circuit and to cause the primary side conversion circuit 20 to function as a part of a DC-DC converter circuit.

The secondary side switching processing unit 510 performs switching control on the respective switching elements constituted by the secondary side first upper arm U2, the secondary side first lower arm /U2, the secondary side second upper arm V2, and the secondary side second lower arm /V2 to cause the secondary side conversion circuit 30 to function as a step-down circuit and to cause the secondary side conversion circuit 30 to function as a part of a DC-DC converter circuit.

As described above, the primary side conversion circuit 20 and the secondary side conversion circuit 30 can be caused to function as a step-up circuit or a step-down circuit, and the power supply circuit 10 can be caused to function as a bidirectional DC-DC converter circuit. Therefore, power conversion can be performed in all of the power conversion modes A to L, or in other words, power conversion can be performed between two input/output ports selected from the four input/output ports.

The transmitted power P (also referred to as the power transmission amount P) adjusted by the control unit 50 in accordance with the phase difference φ is power transmitted from one of the primary side conversion circuit 20 and the secondary side conversion circuit 30 to the other via the transformer 400, and is expressed as $$P=(N \times Va \times Vb)/(\pi \times \omega \times L) \times F(D,\phi)$$ Equation 1

Further, N is a winding ratio of the transformer 400, Va is the input/output voltage of the first input/output port 60a, Vb is the input/output voltage of the third input/output port 60b, π is pi, ω (=2π×f=2π/T) is an angular frequency of the switching operations of the primary side conversion circuit 20 and the secondary side conversion circuit 30, f is a switching frequency of the primary side conversion circuit 20 and the secondary side conversion circuit 30, T is the switching period of the primary side conversion circuit 20 and the secondary side conversion circuit 30, L is an equivalent inductance of the magnetic coupling reactors 204, 304 and the transformer 400 relating to power transmission, and F (D, φ) is a function having the duty ratio D and the phase difference φ as variables and a variable that increases monotonically as the phase difference φ increases, independently of the duty ratio D. The duty ratio D and the phase difference φ are control parameters designed to vary within a range sandwiched between predetermined upper and lower limit values.

The control unit 50 varies the phase difference φ such that a port voltage Vp of at least one predetermined port of the primary side ports and the secondary side ports converges to a target port voltage Vo, thereby to adjust the transmitted power P. Therefore, even if the current consumed by a load connected to the predetermined port increases, the control unit 50 can adjust the transmitted power P by changing the phase difference φ, thereby to prevent the port voltage Vp from decreasing with respect to the target port voltage Vo.

For example, the control unit 50 changes the phase difference φ such that a port voltage Vp of one port that is the transmission destination of the transmitted power P of the primary side ports and the secondary side ports converges to a target port voltage Vo, thereby to adjust the transmitted power P. Therefore, even if the current consumed by a load connected to the port that is the transmission destination of the transmitted power P increases, the control unit 50 may adjust the transmitted power P in an increase direction by changing the phase difference φ to increase, thereby to prevent the port voltage Vp from decreasing with respect to the target port voltage Vo.

<Method for Starting Up Power Conversion Apparatus>

Figure 4:
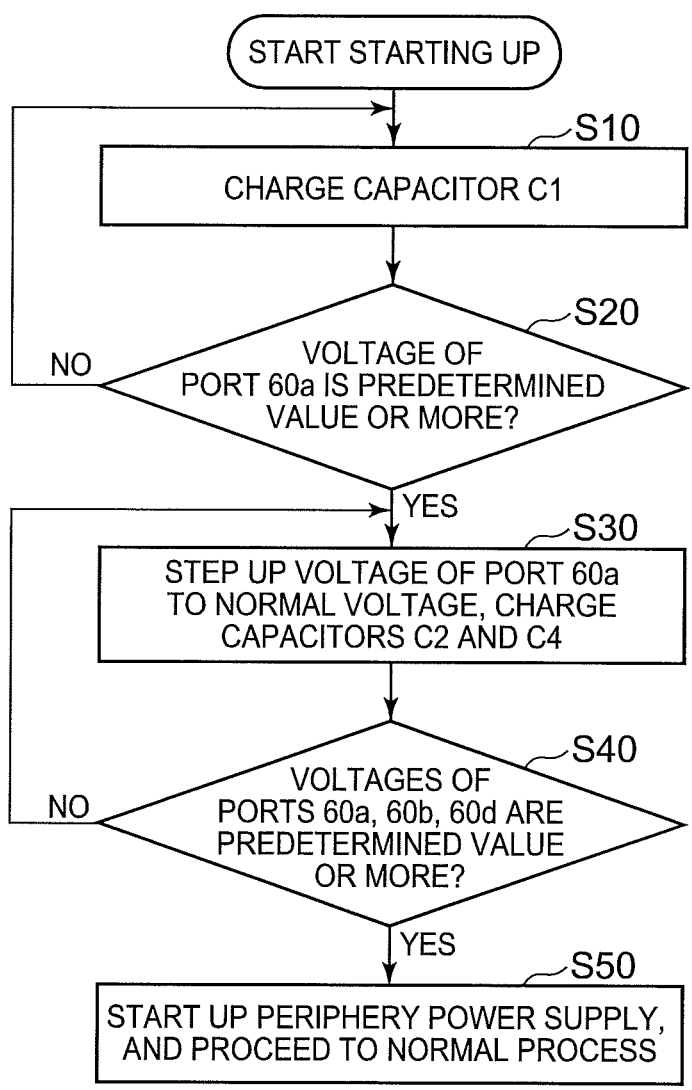
FIG. 4 is a flowchart showing an example of a method for starting up the power conversion apparatus.

FIG. 4 is a flowchart showing an example of a method for starting up the power supply apparatus 101. The control unit 50 can suppress an inrush current flowing from a power supply at periphery of the power supply circuit 10 into the respective capacitors by connecting the power supply at periphery of the power supply circuit 10 to the respective ports after the capacitors of the respective ports are charged to a predetermined value (for example, a fully charged level) in the procedure shown in FIG. 4.

Figure 5:
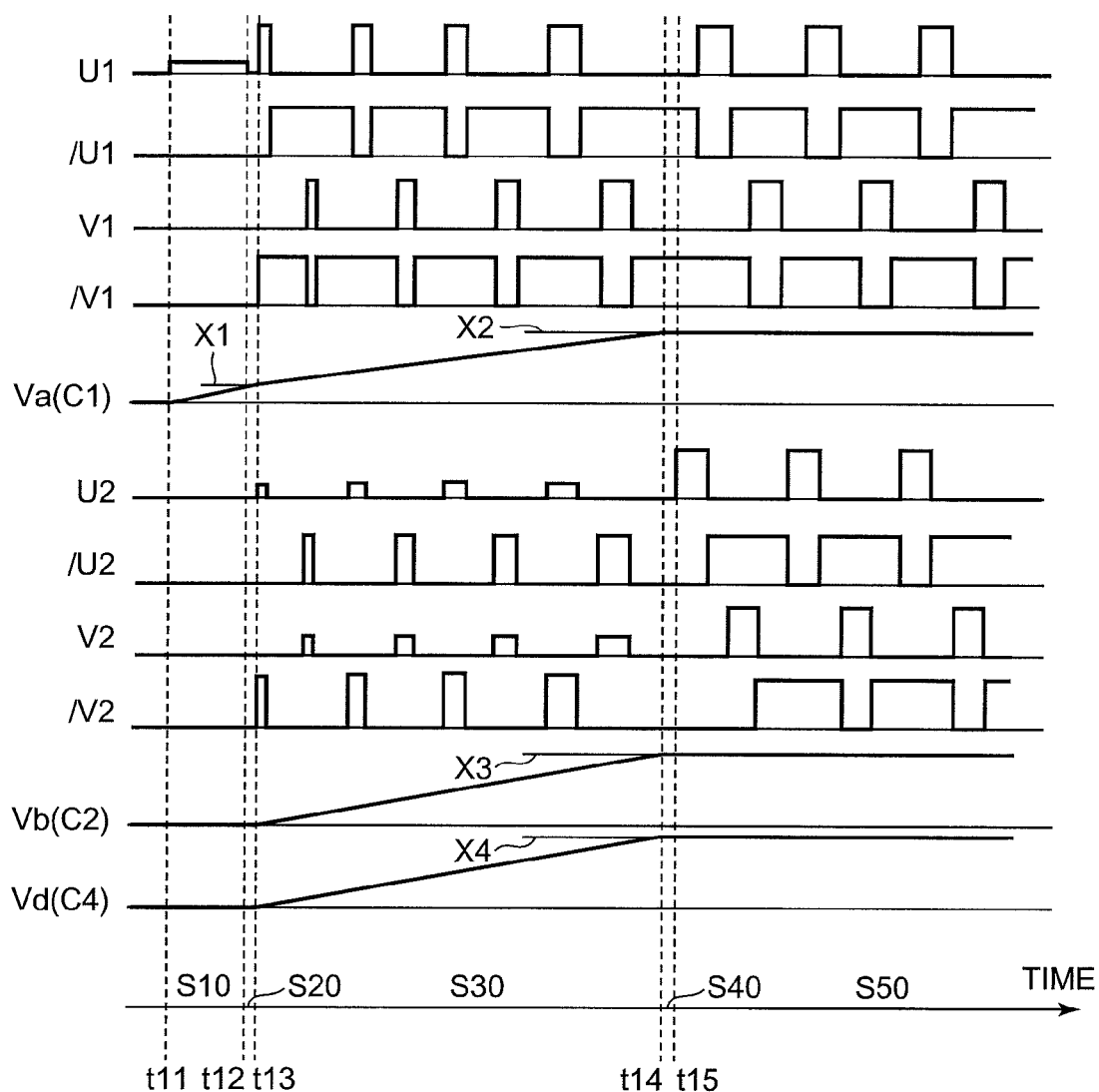
FIG. 5 is a timing chart showing an example of operations of the power conversion apparatus when it is started up.

FIG. 5 is a timing chart showing an example of operations of the power supply apparatus 101 when the power supply apparatus 101 is started up by the starting up method shown in FIG. 4. S10, S20, S30, S40, S50 that are indicated on a time axis of FIG. 5 correspond to timings when respective steps S10, S20, S30, S40, S50 of FIG. 4 are executed. In FIG. 5, eight pulse waveforms such as U1 indicate ON/OFF waveforms of respective arms such as the upper arm U1, and Va (C1), Vb (C2), Vd (C4) indicate voltage waveforms of the port voltages Va, Vb, Vd respectively. The port voltage Va is a voltage of the port 60a, and is equal to a voltage of the capacitor C1. The port voltage Vb is a voltage of the port 60*b*, and is equal to a voltage of the capacitor C2. The port voltage Vd is a voltage of the port 60*d*, and is equal to a voltage of the capacitor C4.

Figure 6:
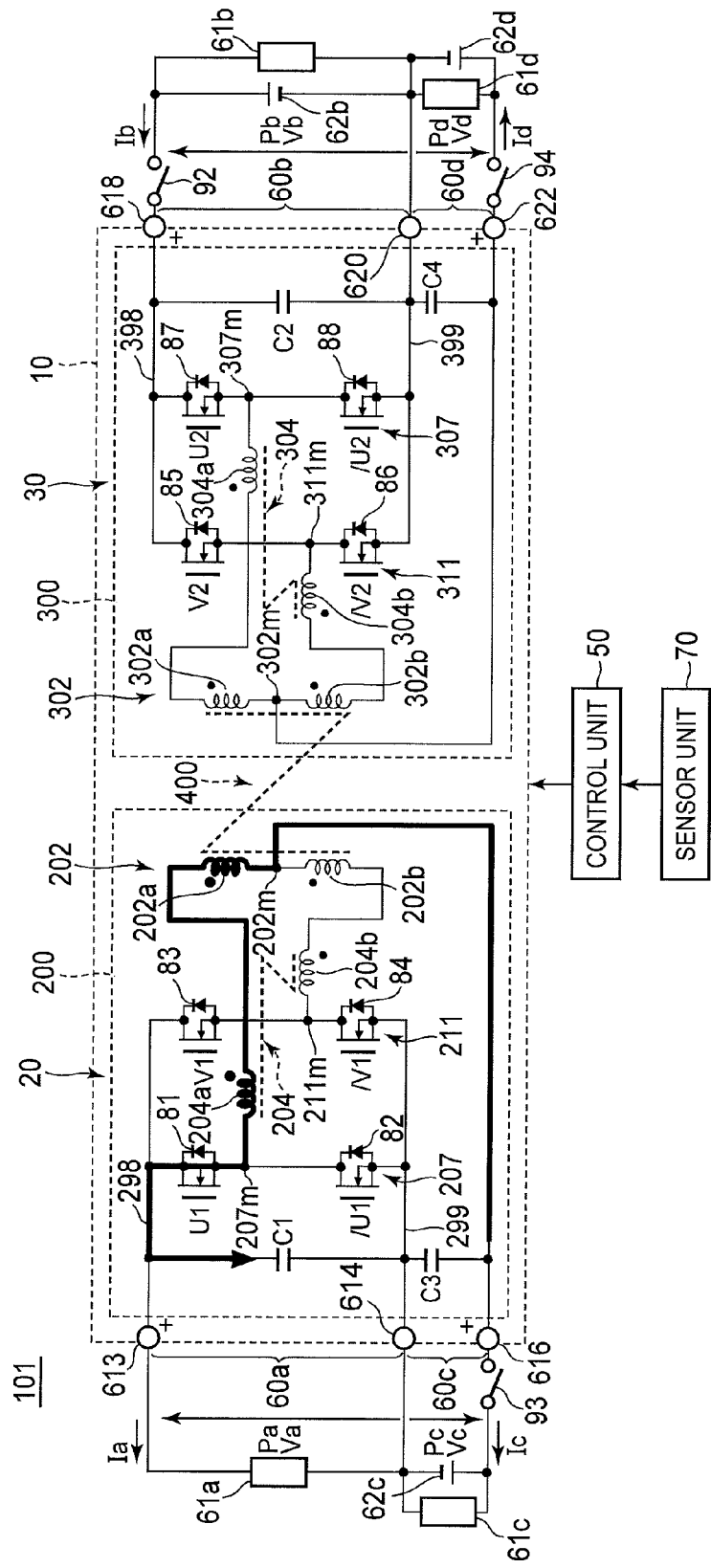
FIG. 6 is a diagram showing an example of a direction and a path of a current charging a capacitor by an arrow.

In step S10 of FIG. 4, as shown in FIG. 6, the capacitor C1 that is connected to the port 60*a* is charged by the control unit 50 via the center tap 202*m* with the power Pc that is input to the port 60*c* from the power supply 62*c* that is connected to the port 60*c*. When the capacitor C1 is charged in step S10, the control unit 50 can suppress a magnitude of an inrush current flowing to the capacitor C1 from the power supply 62*c* via the center tap 202*m* by causing at least one of the upper arm U1 and the upper arm V1 to operate in an active region.

The active region (also referred to as "an activated region") is an operation region in which a switching element is conductive with a predetermined resistance value $R_T$ or more when a gate voltage of the switching element is within a range in which it is equal to or higher than a gate threshold voltage and is equal to or lower than a predetermined voltage value Vth. The predetermined voltage value Vth is a voltage value that is lower than the gate voltage in a steady state after starting up of the power supply apparatus 101 is completed, for example, a voltage value during a mirror period before the switching element enters a saturation region.

When the switching element operates in the active region, the switching element is in a state where it is conductive with the resistance value $R_T$ or more. The active region may also be referred to as a half-ON state indicating an intermediate state of ON and OFF states of the switching element. The active region contains an amplifying operation region in which a resistance value of the switching element decreases linearly and a current flowing to the switching element increases linearly as the gate voltage or a base current increases.

That is, the control unit 50 causes the switching element to function as a current limiting resistor with a variable resistance value by adjusting the gate voltage or the base current of the switching element to a value for operating in the active region during an extremely short period of charging the capacitor when the power supply apparatus 101 is started up.

Note that, as for a target value of a resistance component of the switching element or a current flowing in the switching element, that is, a target value of the gate voltage or the base current, it may be determined according to a heat-resistant specification, an allowable current amount, and the like of the switching element, for example, in only consideration of heat generation of the switching element that operates in the active region. Specifically, the target value of the gate voltage or the base current may be determined such that temperature that is estimated from a power consumption of the switching element, a thermal resistance of a package of the switching element, and the like is equal to or lower than heat-resistant specification temperature.

Therefore, in FIG. 6, a charging current supplied to the capacitor C1 via the center tap 202*m* from the power supply 62*c* is suppressed by the upper arm U1 or V1 that operates in the active region. Thus, by at least one of the upper arm U1 and the upper arm V1 operating in the active region, it is possible to suppress the magnitude of the inrush current flowing to the capacitor C1 from the power supply 62*c* via the center tap 202*m*.

FIGS. 5 and 6 show the case where, in step S10 from a timing t11 to a timing t12, the control unit 50 causes only the upper arm U1 to operate in the active region and switches all the remaining seven arms such as the upper arm V1 OFF. By the control unit 50 causing only the upper arm U1 to operate in the active region, as shown in FIG. 6, the charging current supplied to the capacitor C1 via the center tap 202*m* from the power supply 62*c* flows in a path that goes through the winding 202*a*, the reactor 204*a* and the upper arm U1.

In step S10, the control unit 50 may also cause the upper arm U1 and the upper arm V1 both to operate in the active region. By the upper arm U1 and the upper arm V1 both operating in the active region, it is possible to shorten a time for charging the capacitor C1 while a current limitation is effected. Thus, it is possible to suppress the inrush current of the capacitor C1 and shorten the time until the starting up of the power supply apparatus 101 is completed.

Note that, a configuration not having the diodes 81, 83 in the upper arms U1, V1 is effective in suppression of the inrush current of the capacitor C1. However, even in a configuration having the diodes 81, 83 in the upper arms U1, V1, the control unit 50 may also suppress the inrush current of the capacitor C1 by causing the upper arm U1 or the upper arm V1 to operate in the active region. A preferred example of the configuration having the diodes 81, 83 in the upper arms U1, V1 will be described later.

Further, in FIG. 1, although a switch 93 is inserted between the power supply 62*c* and the terminal 616 of the port 60*c*, the switch 93 may be omitted. The switch 93 is an example of a unit for permitting power input and output between the power supply 62*c* and the port 60*c*. For example, when the switch 93 is turned on by the control unit 50, the power input and output is permitted, and when the switch 93 is turned off by the control unit 50, the power input and output is inhibited. The control unit 50, for example, turns on the switch 93 before the starting up timing t11 (see FIG. 5) of the power supply apparatus 101.

In step S20 of FIG. 4, the control unit 50 determines whether the capacitor C1 is being charged until the port voltage Va is detected to be a specified predetermined value X1 or more. The predetermined value X1 is, for example, a detected value of the port voltage Vc detected by the sensor unit 70, and is a threshold value that is substantially equal to a supply voltage of the power supply 62*c* (for example, 12V).

The control unit 50 continues the processing of step S10 until the port voltage Va is detected by the sensor unit 70 to be the predetermined value X1 or more. The processing of step S30 is performed when the port voltage Va is detected by the sensor unit 70 to be the predetermined value X1 or more.

In step S30 of FIG. 4, the control unit 50 controls the four arms of the secondary side full bridge circuit 300 to transmit the transmitted power P to the secondary side full bridge circuit 300 (see FIG. 5) while controlling the four arms of the primary side full bridge circuit 200 to increase the port voltage Va from the predetermined value X1 to a specified predetermined value X2. The predetermined value X2 is a value greater than the predetermined value X1, for example, a threshold value that is equal to a normal voltage of the port 60*a* (for example, 48V corresponding to the voltage system of the load 61*a*).

The control unit 50 can charge the capacitor C2 that is connected to the port 60*b* and the capacitor C4 that is connected to the port 60*d* at the same time by adjusting the phase difference φ to transmit the transmitter power P from the primary side full bridge circuit 200 to the secondary side full bridge circuit 300. Further, although the phase difference φ is not clearly shown in FIG. 5, the control unit 50 turns on and off the eight arms as shown in FIG. 3 during step S30 from a timing t13 to a timing t14, so as to transmit the transmitted power P corresponding to the phase difference φ.

Figure 7:
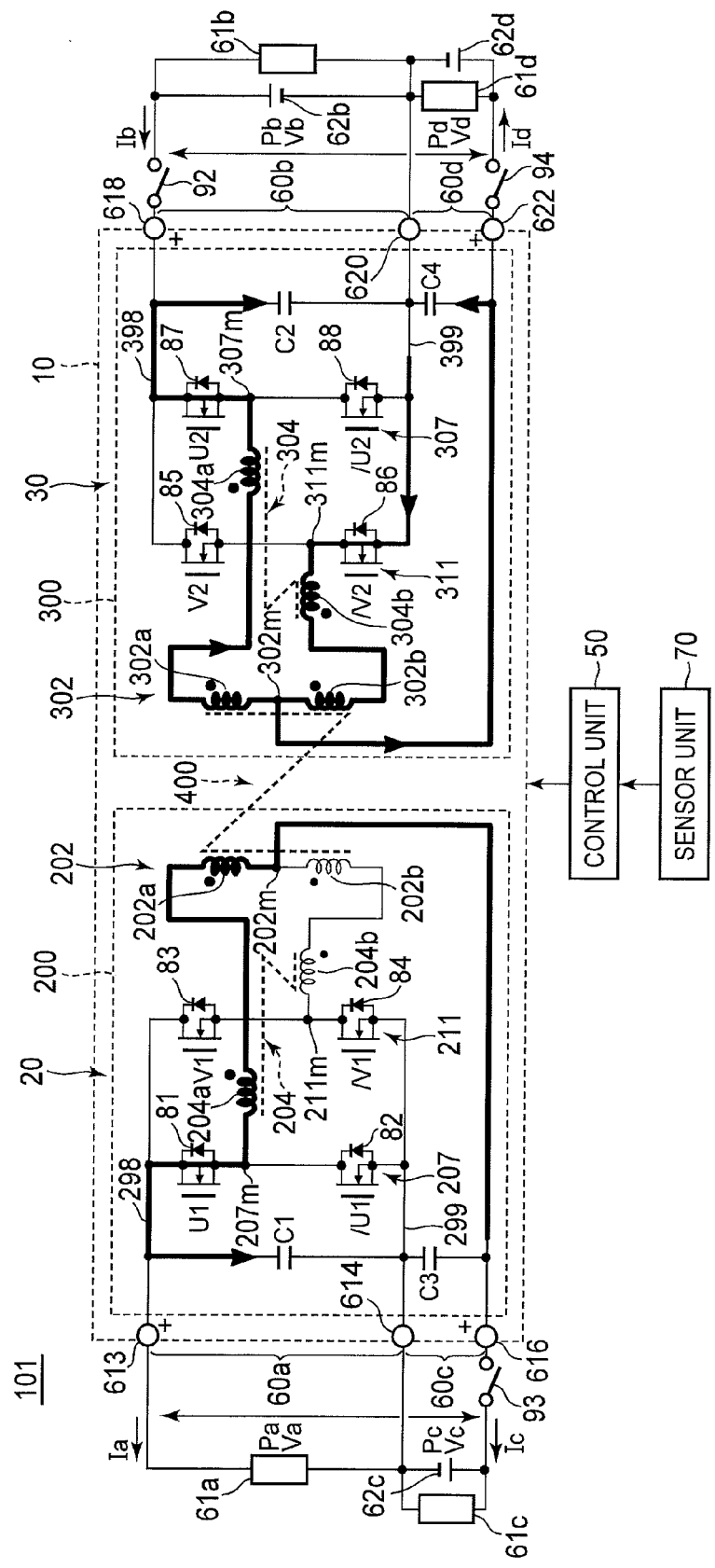
FIG. 7 is a diagram showing an example of a direction and a path of the current charging the capacitor by an arrow.
Figure 8:
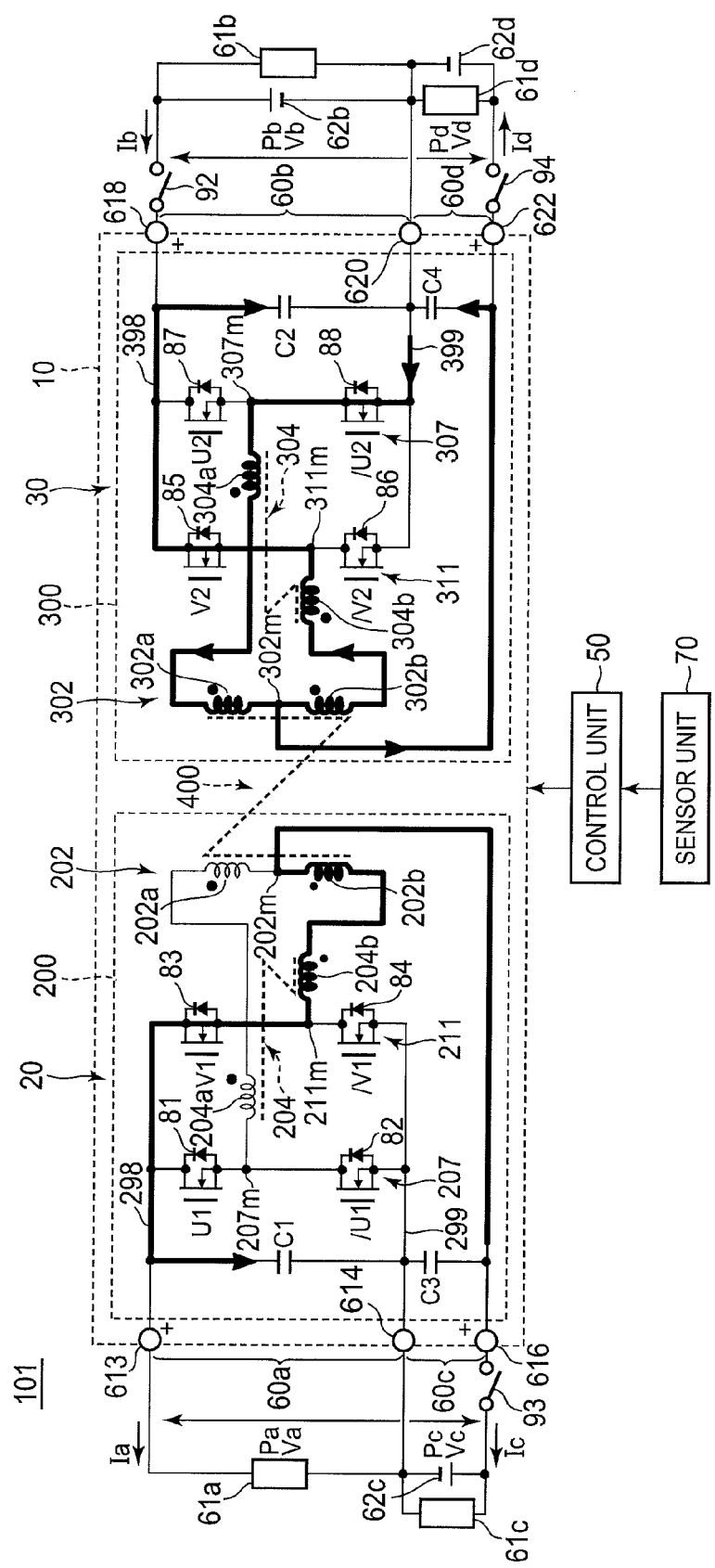
FIG. 8 is a diagram showing an example of a direction and a path of the current charging the capacitor by an arrow.

FIG. 7 shows a direction and a path of the charging current of the capacitors C1, C2, C4 when the upper arm U1, the lower arm /V1, the upper arm U2 and the lower arm /V2 are turned on and the remaining four arms are turned off during a period from the timing t13 to the timing t14 in FIG. 5. FIG. 8 shows a direction and a path of the charging current of the capacitors C1, C2, C4 when the upper arm V1, the lower arm /U1, the upper arm V2 and the lower arm /U2 are turned on and the remaining four arms are turned off during the period from the timing t13 to the timing t14 in FIG. 5. The control unit 50 controls the eight arms to be turned on and off during the period from the timing t13 to the timing t14, so that states shown in FIGS. 7 and 8 are alternately repeated.

In step S30, the control unit 50 controls the ON time δ of each arm of the primary side full bridge circuit 200 with the duty ratio D, thereby to step up the power Pc that is input to the port 60c and output the stepped up power Pa to the port 60a. The control unit 50 gradually increases the port voltage Va with the stepped up power Pa, from the port voltage Va is detected by the sensor unit 70 to be the predetermined value X1 or more until the port voltage Va is detected by the sensor unit 70 to be the predetermined value X2 or more (see FIG. 5). The control unit 50 may also switch the four arms of the primary side full bridge circuit 200 that are turned on with the duty ratio D ON completely in the saturation region when raising the port voltage Va from the predetermined value X1 to the predetermined value X2

The saturation region is referred to an operation region in which the switching element is conductive with a value less than the predetermined resistance value $R_T$. When the switching element is turned on completely in the saturation region, the switching element is in a state where it is conductive with a value less than the resistance value $R_T$.

The control unit 50 also controls the ON time δ of the four arms of the secondary side full bridge circuit 300 with the same duty ratio D as that of each arm of the primary side full bridge circuit 200, when raising the port voltage Va from the predetermined value X1 to the predetermined value X2 in step S30, to transmit the transmitted power P. When turning on one upper arm of the secondary side full bridge circuit 300, as shown in FIG. 7 or 8, the control unit 50 turns on one lower arm that is arranged in a phase opposite to that of the one upper arm.

In step S30, the control unit 50 charges the capacitor C2 with the transmitted power P that is transmitted via the transformer 400 while performing a step up operation of stepping up the power Pc that is input to the port 60c and outputting the stepped up power Pa to the port 60a. When charging the capacitor C2 with the transmitted power P that is transmitted while the step up operation is performed, the control unit 50 can suppress the magnitude of the inrush current flowing to the capacitor C2 based on the transmitted power P by causing at least one of the upper arm U2 and the upper arm V2 to operate in the active region. Further, it is possible to suppress the magnitude of the inrush current flowing to the capacitor C2 from the power supply 62b via the port 60b, even if the power supply 62b is connected to the port 60b through a switch 92, as the capacitor C2 can be pre-charged before the power supply 62b is connected to the port 60b through the switch 92.

Note that, a configuration not having the diodes 87, 85 in the upper arms U2, V2 is effective in suppression of the inrush current of the capacitor C2. However, even in a configuration having the diodes 87, 85 in the upper arms U2, V2, the control unit 50 may also suppress the inrush current of the capacitor C2 by causing the upper arm U2 or the upper arm V2 to operate in the active region. A preferred example of the configuration having the diodes 87, 85 in the upper arms U2, V2 will be described later.

The switch 92 is inserted between the power supply 62b and the terminal 618 of the port 60b. The switch 92 is an example of a unit for permitting power input and output between the power supply 62b and the port 60b. For example, when the switch 92 is turned on by the control unit 50, the power input and output is permitted, and when the switch 92 is turned off by the control unit 50, the power input and output is inhibited.

Since the control unit 50 allows a power supplied by the power supply 62b to be input from the port 60b, for example, when the port voltage Vb is detected by the sensor unit 70 to be a specified predetermined value X3 or more, the switch 92 is turned on. The predetermined value X3 is, for example, a threshold value that is equal to a normal voltage of the port 60b (for example, 288V corresponding to the voltage system of the load 61b or the power supply 62b).

Similarly, in step S30, the control unit 50 charges the capacitor C4 with the transmitted power P that is transmitted via the transformer 400 while performing a step up operation of stepping up the power Pc that is input to the port 60c and outputting the stepped up power Pa to the port 60a. When charging the capacitor C4 with the transmitted power P that is transmitted while the step up operation is performed, the control unit 50 can suppress the magnitude of the inrush current flowing to the capacitor C4 based on the transmitted power P by causing at least one of the lower arm /U2 and the lower arm /V2 to operate in the active region. Further, it is possible to suppress the magnitude of the inrush current flowing to the capacitor C4 from the power supply 62d via the port 60d, even if the power supply 62d is connected to the port 60d through a switch 94, as the capacitor C4 can be pre-charged before the power supply 62d is connected to the port 60d through the switch 94.

Note that, a configuration not having the diodes 88, 88 in the lower arms /U2, /V2 is effective in suppression of the inrush current of the capacitor C4. However, even in a configuration having the diodes 88, 86 in the lower arms /U2, /V2, the control unit 50 may also suppress the inrush current of the capacitor C4 by causing the lower arm /U2 or the lower arm /V2 to operate in the active region. A preferred example of the configuration having the diodes 88, 86 in the lower arms /U2, /V2 will be described later.

The switch 94 is inserted between the power supply 62d and the terminal 622 of the port 60d. The switch 94 is an example of a unit for permitting power input and output between the power supply 62d and the port 60d. For example, when the switch 94 is turned on by the control unit 50, the power input and output is permitted, and when the switch 94 is turned off by the control unit 50, the power input and output is inhibited.

Since the control unit 50 allows a power supplied by the power supply 62d to be input from the port 60d, for example, when the port voltage Vd is detected by the sensor unit 70 to be a specified predetermined value X4 or more, the switch 94 is turned on. The predetermined value X4 is, for example, a threshold value that is equal to a normal voltage of the port 60d (for example, 72V corresponding to the voltage system of the load 61d or the power supply 62d).

Further, in step S30, the control unit 50 may also switch the lower arms /U2, /V2 of the secondary side full bridge circuit 300 that are turned on with the duty ratio D ON completely in the saturation region (see FIG. 5). If there are the diodes 88, 86, it is also possible to turn off the lower arms /U2, /V2 always.

Further, the control unit 50 may also charge the capacitor C2 or C4 with the transmitted power P that is transmitted to the secondary side full bridge circuit 300 while the step up operation of the primary side full bridge circuit 200 is performed after the timing t14 that the port voltage Va gradually increases to reach the predetermined value X2 with the stepped up power Pa. However, the control unit 50 can shorten the time until a timing t15 that the starting up of the power supply apparatus 101 is completed by charging the capacitor C2 or C4 with the transmitted power P that is transmitted during the port voltage Va gradually increases with the stepped up power Pa as shown in FIG. 5 (the period from the timing t13 to the timing t14).

Further, in step S30, for example, the control unit 50 may also gradually increase the duty ratio D of time for which the four arms of the primary side full bridge circuit 200 are tuned on as shown in FIG. 5, and charge the capacitor C1 with the stepped up power Pa. The control unit 50 can improve the effect of suppressing the magnitude of the inrush current flowing to the capacitor C1 via the center tap 202m from the power supply 62c by gradually increasing the duty ratio D and charging the capacitor C1 with the stepped up power Pa.

Similarly, in step S30, for example, the control unit 50 may also gradually increase the duty ratio D of time for which the two upper arms V2, U2 of the secondary side full bridge circuit 300 operate in the active region, and charge the capacitor C2 with the transmitted power P. The control unit 50 can improve the effect of suppressing the magnitude of the inrush current flowing to the capacitor C2 based on the transmitted power P by gradually increasing the duty ratio D and charging the capacitor C2 with the transmitted power P.

Similarly, in step S30, for example, the control unit 50 may also gradually increase the duty ratio D of time for which the two lower arms /V2, /U2 of the secondary side full bridge circuit 300 operate in the active region, and charge the capacitor C4 with the transmitted power P. The control unit 50 can improve the effect of suppressing the magnitude of the inrush current flowing to the capacitor C4 based on the transmitted power P by gradually increasing the duty ratio D and charging the capacitor C4 with the transmitted power P.

Figure 9:
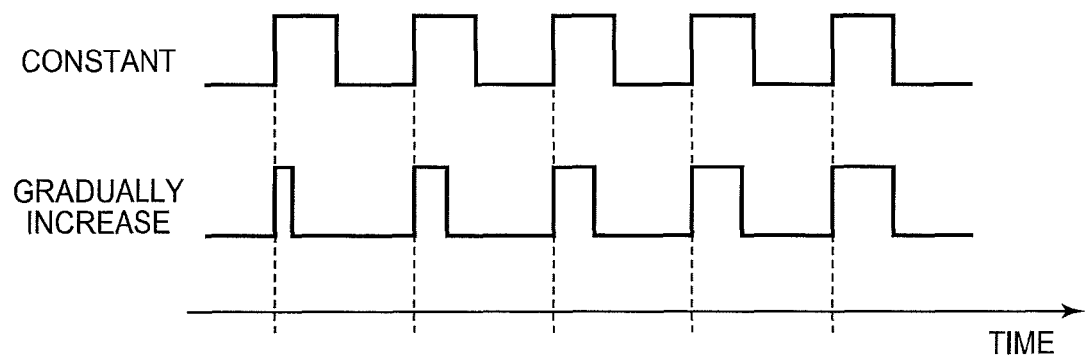
FIG. 9 is a timing chart showing an example of a duty ratio that gradually increases.

FIG. 9 is a diagram showing an example of an ON/OFF waveform of the arms when the duty ratio D is constant, and an example of an ON/OFF waveform of the arms when the duty ratio D gradually increases.

In FIG. 9, the ON/OFF waveform when the duty ratio D is constant shows the case where the control unit 50 performs a normal control of adjusting the transmitted power P or the duty ratio D to make a feedback value of the port voltage Vp of each port coincide with the target port voltage Vo. In the case where the voltage of the capacitor connected to each port is very low relative to the target port voltage Vo when the power supply apparatus 101 is started up, the control unit 50 increases the duty ratio D to the maximum extent from start of the feedback control so that the feedback value of the port voltage Vp rapidly coincides with the target port voltage Vo. Therefore, it is likely to increase the inrush current flowing to the capacitor.

In contrast, the control unit 50 can improve the effect of suppressing the magnitude of the inrush current flowing to the capacitor by gradually increasing the duty ratio D at a predetermined increasing rate instead of performing the feedback control of making the feedback value of the port voltage Vp coincide with the target port voltage Vo. Alternatively, a time required to charge the capacitor is pre-derived analytically or experimentally according to a capacity of the capacitor, and the control unit 50 gradually increases the duty ratio D such that the pre-derived time reaches a stable target duty ratio, which can improve the effect of suppressing the inrush current of the capacitor.

In step S40 of FIG. 4, the control unit 50 allows the power supplied by the power supply 62b to be input from the port 60b when the port voltage Va is detected by the sensor unit 70 to be the predetermined value X2 or more and the port voltage Vb is detected by the sensor unit 70 to be the predetermined value X3 or more (step S50). Therefore, it is possible to suppress the inrush current flowing to the capacitor C2 from the power supply 62b. Similarly, the control unit 50 allows a power supplied by the power supply 62d to be input from the port 60d when the port voltage Va is detected by the sensor unit 70 to be the predetermined value X2 or more and the port voltage Vd is detected by the sensor unit 70 to be the predetermined value X4 or more (step S50). Therefore, it is possible to suppress the inrush current flowing to the capacitor C4 from the power supply 62d.

In step S50, for example, the control unit 50 the normal control of adjusting the transmitted power P or the duty ratio D to make the feedback value of the port voltage Vp of each port coincide with the target port voltage Vo after the timing t15 that is shown in FIG. 5. On the other hand, if the condition of step S40 is not satisfied, the control unit 50 continues the processing of step S30 of charging the capacitor C2 or C4.

Figure 10:
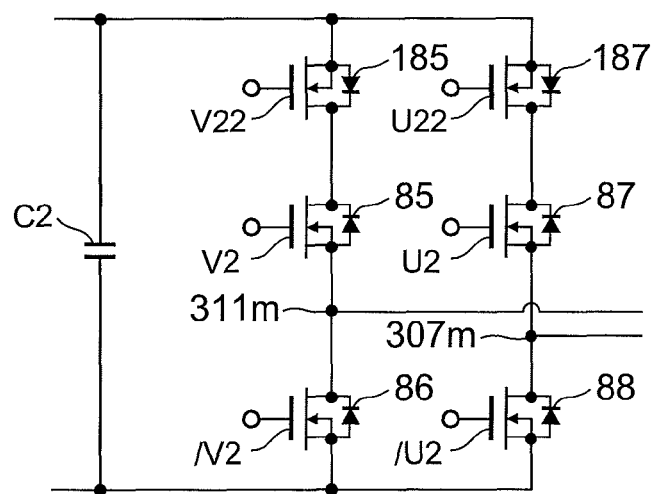
FIG. 10 is a diagram showing an example of a structure in which diodes of an upper arm are disposed oppositely.

FIG. 10 shows a preferred example of a configuration having a diode in the upper arm, and shows a configuration having diodes 87, 85 in the upper arms U2, V2 of the secondary side. In the case of FIG. 10, the secondary side full bridge circuit 300 includes a U phase upper arm in which the upper arm U2 and an upper arm U22 are connected in series, and a V phase upper arm in which the upper arm V2 and an upper arm V22 are connected in series. The upper arm U2 is an example of a first switching element having a first diode 87 provided in parallel with a direction for charging the capacitor C2 as a forward direction, and the upper U22 is an example of a second switching element having a second diode 187 provided in parallel with a direction opposite to the direction of the first diode 87 as the forward direction. Similarly, the upper arm V2 is an example of the first switching element having the first diode 85 provided in parallel with the direction for charging the capacitor C2 as the forward direction, and the upper arm V22 is an example of the second switching element having the second diode 185 provided in parallel with a direction opposite to the direction of the first diode 85 as the forward direction.

When charging the capacitor C2 with the transmitted power P, the control unit 50 can suppress the inrush current of the capacitor C2 flowing through the upper arm U22 or V22 via the diode 85 or 87 by causing the upper arm U22 or the upper arm V22 to operate in the active region in a state where the upper arms U2 and V2 are turned off.

Further, the configuration of FIG. 10 is also applicable to the case where there are diodes 81, 83 in the primary side upper arms U1, V1. The description of the primary side upper arm is incorporated by with reference to the above description of the secondary side upper arm.

Figure 11:
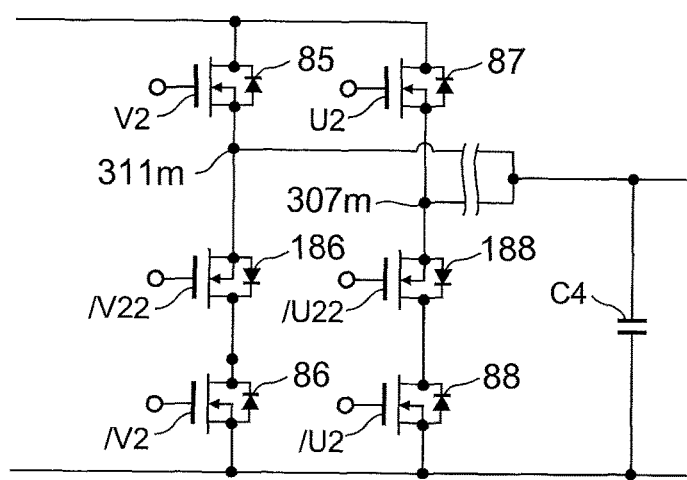
FIG. 11 is a diagram showing an example of a structure in which diodes of a lower arm are disposed oppositely.

FIG. 11 shows a preferred example of a configuration having a diode in the lower arm, and shows a configuration having diodes 88, 86 in the lower arms /U2, /V2 of the secondary side. In the case of FIG. 11, the secondary side full bridge circuit 300 includes a U phase lower arm in which the lower arm /U2 and an lower arm /U22 are connected in series, and a V phase lower arm in which the lower arm /V2 and an lower arm /V22 are connected in series. The lower arm /U2 is an example of a third switching element having a third diode 88 provided in parallel with a direction for charging the capacitor C4 as a forward direction, and the lower /U22 is an example of a fourth switching element having a fourth diode 188 provided in parallel with a direction opposite to the direction of the third diode 88 as the forward direction. Similarly, the lower arm /V2 is an example of the third switching element having the third diode 86 provided in parallel with the direction for charging the capacitor C4 as the forward direction, and the lower arm /V22 is an example of the fourth switching element having the fourth diode 186 provided in parallel with a direction opposite to the direction of the third diode 86 as the forward direction.

When charging the capacitor C4 with the transmitted power P, the control unit 50 can suppress the inrush current of the capacitor C4 flowing through the lower arm /U22 or /V22 via the diode 88 or 86 by causing the lower arm /U22 or the lower arm /V22 to operate in the active region in a state where the lower arms /U2 and /V2 are turned off.

Further, the configuration of FIG. 11 is also applicable to the case where there are diodes 82, 84 in the primary side lower arms /U1, /V1. The description of the primary side lower arm is incorporated by with reference to the above description of the secondary side lower arm.

Figure 12:
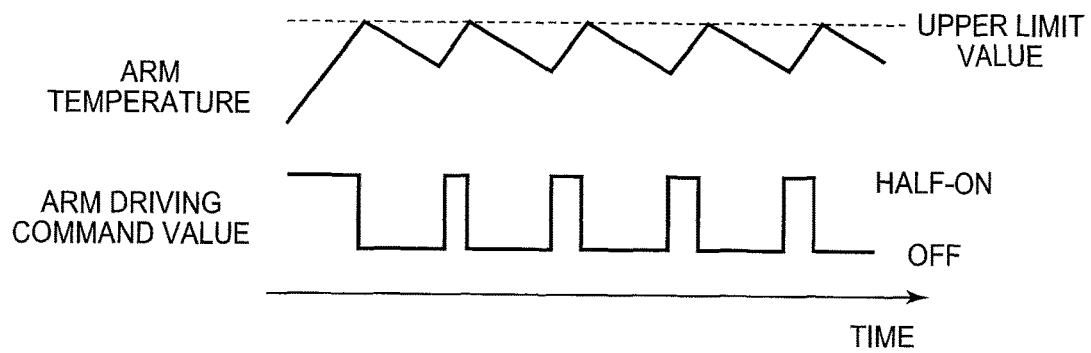
FIG. 12 is a timing chart showing an example in which an operation of an arm in an active region is interrupted.

FIG. 12 is a diagram showing that depending on current or temperature in any arm of the primary side full bridge circuit 200 or the secondary side full bridge circuit 300, the control unit 50 interrupts the operation of causing the arm to operate in the active region. At a timing when the current or temperature of the arm that is operating in the active region is detected by the sensor unit 70 to be a predetermined upper limit value or more, the control unit 50 may also turn off temporarily a driving command value of the arm, and cause the arm to operate in the active region again after a predetermined time has elapsed since it was turned off temporarily. Therefore, it is possible to prevent a failure of the arm due to an overcurrent or overheating.

An embodiment of the power conversion apparatus and the method for starting up the same was described above, but the invention is not limited to the above embodiment, and various amendments and improvements, such as combining or replacing the above embodiment either partially or wholly with another embodiment, may be implemented within the scope of the invention.

For example, in the above embodiment, a MOSFET, which is a semiconductor element subjected to an ON/OFF operation, was cited as an example of the switching element. However, the switching element may be a voltage control type power element using an insulating gate such as an insulated gate bipolar transistor (IGBT) or a MOSFET, or a bipolar transistor, for example.

Further, a power supply may be connected to the first input/output port 60a. Further, a power supply may be connected to the third input/output port 60b, and a power supply need not be connected to the fourth input/output port 60d. Further, a power supply need not be connected to the third input/output port 60b, and a power supply may be connected to the fourth input/output port 60d.

Further, the present invention is suitable for a power conversion apparatus that has a plurality of, at least three or more, input/output ports and is capable of converting power between any two input/output ports of the plurality of, at least three or more, input/output ports. For example, the present invention is also suitable for the power supply apparatus configured to not include any one input/output port of the four input/output ports as illustrated in FIG. 1.

Further, in the above description, the primary side may be defined as the second side, and the second side may be defined as the primary side. In the above description, although a case that the transmitted power P is transmitted to the primary side port from the secondary side port has been illustrated as an example, the above description can be applied to the case that the transmitted power P is transmitted to the secondary side port from the primary side port.

What is claimed is:

1. A power conversion apparatus comprising:
   a transformer;
   a primary side full bridge circuit that is provided on a primary side of the transformer;
   a first port that is connected to the primary side full bridge circuit;
   a second port that is connected to a center tap of the primary side of the transformer;
   a secondary side full bridge circuit that is provided on a secondary side of the transformer;
   a third port that is connected to the secondary side full bridge circuit; and
   a control unit that is programmed to cause a first switching element in an upper arm of the secondary side full bridge circuit to operate in an active region throughout a period when a capacitor that is connected to the third port is charged with a transmitted power that is transmitted to the secondary side full bridge circuit via the transformer from the primary side full bridge circuit when a power of the second port is stepped up and the stepped up power is output to the first port.

2. The power conversion apparatus according to claim 1, wherein the control unit is programmed to gradually increase a duty ratio of time for which the first switching element operates in the active region, and to charge the capacitor that is connected to the third port with the transmitted power.

3. The power conversion apparatus according to claim 1, wherein
   the first switching element has a first diode provided in parallel with a direction for charging the capacitor as a forward direction and the upper arm of the second side full bridge circuit further includes a second switching element having a second diode provided in parallel with a direction opposite to the direction of the first diode as a forward direction are connected in series, and
   the control unit is programmed to cause the second switching element to operate in the active region, and to charge the capacitor that is connected to the third port with the transmitted power.

4. The power conversion apparatus according to claim 1, wherein the control unit is programmed to allow a power to be input from the third port when a voltage of the capacitor that is connected to the third port is equal to or greater than a predetermined value.

5. The power conversion apparatus according to claim 1, further comprising a fourth port that is connected to a center tap of the secondary side of the transformer, wherein
   the control unit is programmed to charge a capacitor that is connected to the fourth port with the transmitted power.

6. The power conversion apparatus according to claim 5, wherein the control unit is programmed to cause a third switching element of a lower arm of the secondary side full bridge circuit to operate in the active region when the capacitor that is connected to the fourth port is charged with the transmitted power.

7. The power conversion apparatus according to claim 6, wherein the control unit is programmed to gradually increase a duty ratio of time for which the the third switching element operates in the active region, and to charge the capacitor that is connected to the fourth port with the transmitted power.

8. The power conversion apparatus according to claim 6, wherein
the third switching element has a third diode provided in parallel with a direction for charging the capacitor as a forward direction and the lower arm of the secondary side full bridge circuit further includes a fourth switching element having a fourth diode provided in parallel with a direction opposite to the direction of the third diode as a forward direction are connected in series, and
the control unit is programmed to cause the fourth switching element to operate in the active region, and to charge the capacitor that is connected to the fourth port with the transmitted power.

9. The power conversion apparatus according to claim 5, wherein the control unit is programmed to allow a power to be input from the fourth port when a voltage of the capacitor that is connected to the fourth port is equal to or greater than a predetermined value.

10. The power conversion apparatus according to claim 1, wherein the control unit is programmed to cause a fifth switching element of an upper arm of the primary side full bridge circuit to operate in the active region when a capacitor that is connected to the first port is charged by a power supply that is connected to the second port via the center tap of the primary side.

11. The power conversion apparatus according to claim 10, wherein the control unit is programmed to gradually increase a voltage of the capacitor that is connected to the first port with the stepped up power from detecting that the voltage of the capacitor that is connected to the first port is equal to or greater than a first threshold value until detecting that the voltage of the capacitor that is connected to the first port is equal to or greater than a second threshold value that is greater than the first threshold value.

12. The power conversion apparatus according to claim 11, wherein the control unit is programmed to gradually increase a duty ratio of time for which an arm of the primary side full bridge circuit is turned on, and to charge the capacitor that is connected to the first port with the stepped up power.

13. The power conversion apparatus according to claim 1, wherein the control unit is programmed to charge the capacitor that is connected to the third port with the transmitted power that is transmitted during a period of gradually increasing a voltage of the first port with the stepped up power.

14. The power conversion apparatus according to claim 1, wherein the control unit is programmed to interrupt, according to current or temperature of an arm of the primary side full bridge circuit or current or temperature of an arm of the secondary side full bridge circuit, an operation of a switching element corresponding to the arm in the active region.

15. The power conversion apparatus according to claim 1, wherein
the active region is an operation region in which the first switching element is conductive with a predetermined resistance value RT or more when a gate voltage of the first switching element is within a range in which it is equal to or higher than a gate threshold voltage and is equal to or lower than a predetermined voltage value Vth, and
the predetermined voltage value Vth is a voltage value that is lower than the gate voltage in a steady state after starting up of the power supply apparatus is completed.

16. A method for starting up a power conversion apparatus, which includes a transformer; a primary side full bridge circuit that is provided on a primary side of the transformer; a first port that is connected to the primary side full bridge circuit; a second port that is connected to a center tap of the primary side of the transformer; a secondary side full bridge circuit that is provided on a secondary side of the transformer; and a third port that is connected to the secondary side full bridge circuit, the method for starting up the power conversion apparatus comprising:
causing a switching element in an upper arm of the secondary side full bridge circuit to operate in an active region throughout a period when a capacitor that is connected to the third port is charged with a transmitted power that is transmitted to the secondary side full bridge circuit via the transformer from the primary side full bridge circuit when a power of the second port is stepped up and the stepped up power is output to the first port.

* * * * *